United States Patent
Bird et al.

(10) Patent No.: US 9,001,813 B2
(45) Date of Patent: *Apr. 7, 2015

(54) RADIO SYSTEM WITH CONFIGURABLE LINKS

(71) Applicant: Koninklijke Philips N.V., Eindhoven (NL)

(72) Inventors: Neil C. Bird, Bottisham (GB); Alan J. Davie, Milton (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,361

(22) Filed: May 2, 2014

(65) Prior Publication Data

US 2014/0302792 A1    Oct. 9, 2014

Related U.S. Application Data

(63) Continuation of application No. 10/574,433, filed as application No. PCT/IB2004/051920 on Sep. 29, 2004, now Pat. No. 8,724,608.

(30) Foreign Application Priority Data

Oct. 3, 2003   (GB) .................................. 0323132.1

(51) Int. Cl.
*H04J 1/00*    (2006.01)
*H04W 76/02*   (2009.01)
*H04L 12/28*   (2006.01)
*H04W 4/00*    (2009.01)
*H04W 84/18*   (2009.01)

(52) U.S. Cl.
CPC .......... *H04W 76/021* (2013.01); *H04L 12/2803* (2013.01); *H04W 84/18* (2013.01); *H04W 4/008* (2013.01)

(58) Field of Classification Search
USPC ......... 455/41.1–41.3, 418–420, 414.1–414.2, 455/456.1–456.6, 500, 507, 517–519; 370/310, 343; 340/10, 33
See application file for complete search history.

(56) References Cited

U.S. PATENT DOCUMENTS 5,493,696 A    2/1996   Wolf
5,926,764 A    7/1999   Sarpola et al.
(Continued)

FOREIGN PATENT DOCUMENTS

CN    2351827 Y    12/1999
EP    1330075      7/2003
(Continued)

*Primary Examiner* — Brandon Miller (57) ABSTRACT

A system includes radio devices where radio links between the devices are configured by bringing the radio devices in close proximity for a few seconds. A proximity detector of a radio device detects the proximity of another radio device and an automatic registration process begins to configure a link between the devices. One-to-one or one-to-many links may be established. Links may be cancelled by repeating the process. The devices may include an indicator to indicate establishment of the link.

32 Claims, 7 Drawing Sheets

(56) References Cited

U.S. PATENT DOCUMENTS

| | | |
|---|---|---|
| 6,130,602 A | 10/2000 | O'Toole et al. |
| 6,347,095 B1 | 2/2002 | Tang et al. |
| 6,980,083 B2 | 12/2005 | Sako et al. |
| 8,724,608 B2 * | 5/2014 | Bird et al. .................... 370/343 |
| 2002/0174269 A1 | 11/2002 | Spurgat et al. |
| 2003/0162556 A1 | 8/2003 | Libes |
| 2004/0203381 A1 | 10/2004 | Cahn et al. |
| 2004/0204072 A1 | 10/2004 | Han et al. |
| 2004/0248569 A1 | 12/2004 | Kondou et al. |
| 2005/0020211 A1 | 1/2005 | Takikita |

FOREIGN PATENT DOCUMENTS

| | | |
|---|---|---|
| JP | H07143043 A | 6/1995 |
| JP | H0816855 A | 1/1996 |
| JP | H11150547 A | 6/1999 |
| WO | 9620464 A | 7/1996 |
| WO | 9917566 A1 | 4/1999 |
| WO | 0137597 A | 5/2001 |

* cited by examiner

RADIO SYSTEM WITH CONFIGURABLE LINKS

This application claims the benefit or priority of and describes the relationships between the following applications: wherein this application is a continuation of U.S. patent application Ser. No. 10/574,433, filed Apr. 3, 2006, which is the National Stage of International Application No. PCT/IB2004/051920, filed Sep. 29, 2004, which claims the priority of foreign application GB 0323132.1 filed Oct. 3, 2003 all of which are incorporated herein in whole by reference.

The present invention relates to a radio system with user-friendly re-configurable links, a method for reconfiguring the links and devices for providing said links between host apparatus. The present invention has particular, but not exclusive, application to home and portable consumer systems having host apparatus for handling audio/video content, such as portable music/video players, home "Hi-Fi" units, mobile telephones, personal digital assistants/portable computers and the like.

The installation and configuration of a wireless link between two or more host apparatus is often unduly complicated and may require technical knowledge and understanding of, for example, network topology. It is also often difficult for a consumer to know and keep track of which host apparatus is linked to which in his home, and which host apparatus may be linked with which host apparatus.

It is therefore desirable to provide user friendly reconfigurable wireless links in a radio system.

According to a first aspect of the present invention there is provided a method of configuring a radio link between a first device and a second device, each of which comprises radio means, proximity detection means and timing means, wherein the method comprises said proximity detection means detecting when said first and second device are proximate, timing means detects the duration of proximity and respective radio means configures a link in dependence on said proximity detection and the duration thereof.

According to a second aspect of the present invention there is provided a system having a first and a second radio device, operable to communicate via a configurable radio link therebetween, each device comprising proximity detection means for detecting when said devices are proximate, timing means for detecting the duration of said proximity and radio means for configuring a radio link in dependence on said proximity detection and the duration thereof.

According to a third aspect of the present invention there is provided a radio device operable to communicate via a configurable radio link with a second device, the radio device comprising proximity detection means for detecting when said devices are proximate, timing means for detecting the duration of said proximity and radio means for configuring a radio link in dependence on said proximity detection and the duration thereof.

The above aspects provide a radio system in which a user is enabled to easily configure a wireless link between devices.

In a preferred embodiment the link is provided by first and second radio devices, which are portable and can be plugged into, or engaged with respective host apparatus. The radio devices (or "e-buttons") must be registered with each other in order to enable their respective hosts to communicate via the radio devices over a link therebetween.

Advantageously, the link is established by a user bringing together the first and second devices so that they are physically separated by a centimeter or less. A proximity detection switch within each device is magnetically operated when the devices are proximate, and a radio micro-controller begins timing the duration of proximity. When the duration exceeds a predetermined duration (for example about 2 seconds), the micro-controller of each device begins the registration process via inbuilt radio transceivers in order to establish a link.

Radio identifiers (either provided within said micro-controllers, or randomly generated by said micro-controllers) are exchanged, and an indication (a flashing LED for example) indicates to the user that the link between the devices is established.

The user may then engage each device with a suitably equipped host apparatus, thereby enabling said host apparatus to communicate via the configured link.

When the user wishes to cancel or disable a link, the devices are disengaged from their respective host apparatus and once again brought into close proximity with each other. The micro-controllers, operating in tandem with the proximity detection means as earlier, exchange identifiers and, in recognising the exchanged identifiers as having been previously exchanged, simply delete said identifiers to disable the registration.

Furthermore, in a similar fashion, a single radio device may be registered or associated with many other similar radio devices, enabling "one-to-many" links.

The system provides a simple visual indicator of which apparatus is communicable or linked with another to the user (since the presence of the device engaged with the host apparatus signifies visually to the user the communication capability).

Owing to the inventive aspects described above, the configuration of the aforementioned radio links involves the simple action of bringing together the required devices for a few seconds. Of course, the devices operate the same radio protocol and hence enable wireless links to be added to suitably equipped host apparatus from different manufacturers, ensuring interoperability and a simple radio upgrade path as radio standards improve.

The devices may be sold in blister packs, which the consumer may buy at a later date to the purchase of suitable host apparatus, or the devices may be provided with the sale of said host apparatus to offer additional functionality of said apparatus.

Areas of application comprise the streaming of an audio stream from, for example, a Hi-Fi system having a first radio device to a remote loudspeaker equipped with a second radio device which was earlier registered with the first device as previously described. The consumer may remove the first device from the Hi-Fi system and plug it into a suitably equipped portable audio player such as an MP3 or Minidisc™ player. Hence, content from the portable player may also be streamed to a loudspeaker in the home via the wireless link between first and second engaged devices. The first device may advantageously register with other similar devices engaged in other loudspeakers around the home, hence enabling audibility of the audio content throughout the home.

Such first and second radio devices are hereinafter referred to as "e-buttons", whereas the phrase "host apparatus" comprises consumer electronic and computing devices equipped with e-button receiving or engaging means which engage an e-button and provide data to it for output over a radio link.

The present invention will now be described, by way of example only, and with reference to the accompanying drawings in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

Figure 1:
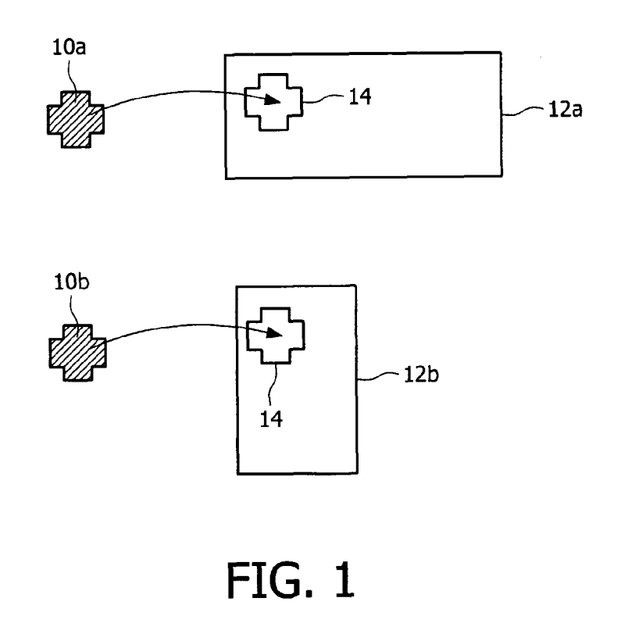
FIG. 1 illustrates host apparatus and separate e-buttons.

FIG. 1 shows a first detachable e-button 10a operable to engage with a respective host apparatus 12a, which comprises a socket 14, adapted for receiving the detachable e-button 10a and for providing or receiving data from said engaged e-button. Also shown is a second host apparatus 12b having a similar socket 14 for receiving a respective e-button 10b. In the diagram the e-buttons 10a, 10b are depicted having a distinctive cross-like shape, with the engaging sockets 14 having a similar design to receive e-buttons 10,10b. Of course, the e-buttons may take many other physical forms.

In the following description, for the sake of simplicity, clarity, and by way of example only, the host apparatus 12a, 12b represent an audio Hi-Fi system and a remote loudspeaker respectively. Of course, the Hi-Fi and loudspeaker may comprise conventional sockets enabling audio connection and output. However, such apparatus 12a, 12b with e-button connection means 14 optionally allow configurable wireless links to be employed, enabling a user to establish and control in a simple, intuitive fashion what is in effect a radio network between chosen apparatus or devices 12a, 12b in his home.

Figure 2:
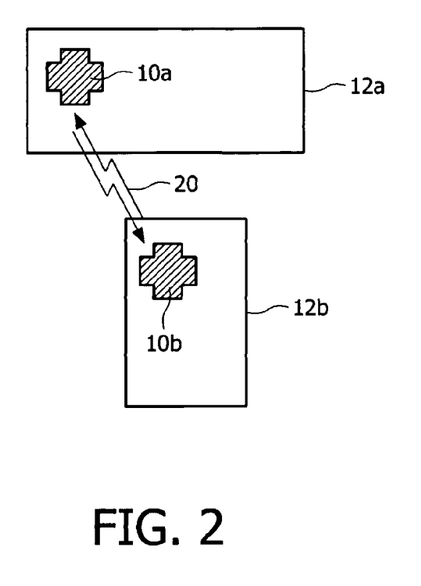
FIG. 2 illustrates host apparatus communicating via engaged e-buttons.

This is illustrated simply in FIG. 2, which shows the Hi-Fi 12a communicating wirelessly with the loudspeaker 12b across a previously configured radio link 20 via inserted respective e-buttons 10a, 10b. FIG. 2 illustrates the intention that such e-buttons should be visible and recognisable to the user. Hence, the presence of the detachable e-button illustrates the facts that the apparatus has a wireless connection capability.

The configuration of such a link 20 will now be described with reference to FIGS. 3, 4 and 5.

Figure 3:
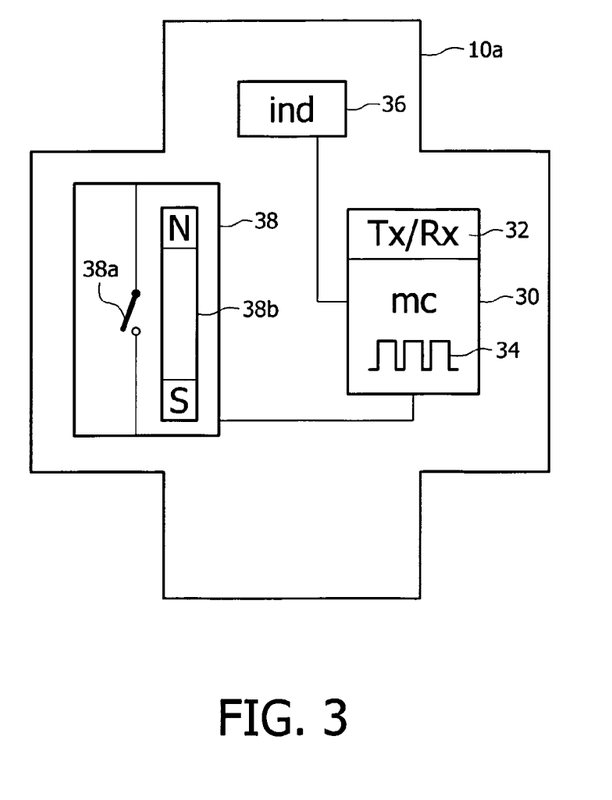
FIG. 3 is a schematic diagram showing internal components of an e-button.

FIG. 3 illustrates in more detail an example e-button device 10a. The device 10a comprises a radio micro-controller integrated circuit or "chip" (such as the well known mc8051 series of micro-controllers), which operates a radio transceiver 32 when sending or receiving radio messages. Such messages are preferably arranged according to a digital radio standard provided in hardware and software of the micro-controller/transceiver architecture. ZigBee (IEEE802.15.4) and the IEEE 802.11 family of radio standards are suitable example radio standards well known to those skilled in the art.

The micro-controller comprises timing means in the form of an internal clock oscillator 34 as is usual with such integrated circuit controllers or microprocessors. The micro-controller in this embodiment has a small amount of internal memory (not shown) for storing program instructions (a radio "stack") and variables (such as device identifiers) relating to the operation of the radio standard, and also for storing program instructions for carrying out method aspects in accordance with the present invention as will be shortly described.

The micro-controller 30 also controls indication means 36 in the form of a light emitting diode (LED) for indicating to a user the status of the e-button. The indication means 36 may also comprise loudspeaker and tone generation circuitry to provide audible indications of the e-button status to the user.

The micro-controller 30 is further connected to proximity detection means in the form of, in this embodiment, a magnetic switch module 38. The module 38 comprises a magnetically activated Reed switch 38a and a permanent magnet 38b. The switch and magnet are arranged such that some of the magnetic field lines emanating from the magnet 38b are perpendicular to the direction in which the switch closes. Hence, the switch experiences a closing force due to the magnet. However, the field strength of the magnet 38b is chosen as to be just insufficient to close the switch 38a. Hence, an increase in magnetic field strength is required for the switch 38a to close and for subsequent detection of the switch status by micro-controller 30.

Figure 4A:
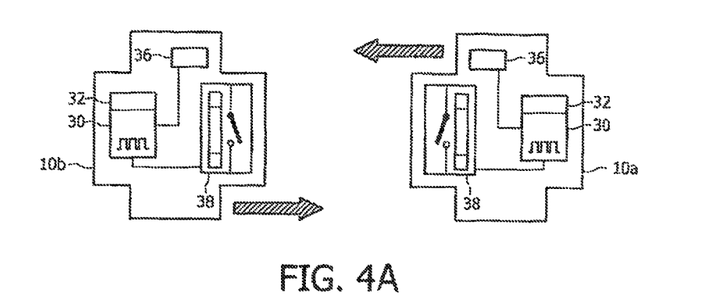
FIG. 4A is a diagram illustrating a first step in the configuration of a link between a first and second e-button.
Figure 4B:
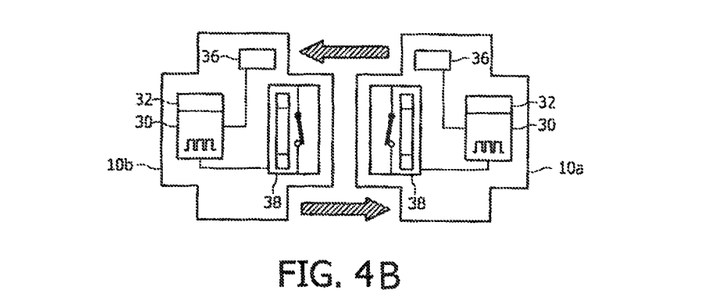
FIG. 4B is a diagram illustrating a second step in the configuration of a link between a first and second e-button.

FIGS. 4A, 4B and 4C illustrate in three steps a configuration operation utilising a first and second e-button as described above. FIG. 4A illustrates a first e-button 10a separated by more than a few centimeters from a second similar e-button 10b. Respective proximity detecting switch modules are in a default open state as shown. A user wishing to configure a link subsequently brings the two e-buttons 10a, 10b into close proximity with one another as shown in FIG. 4B. The magnets 38b cause a local increase in the magnetic field strength surrounding each switch module 38, causing each e-button switch 38a to close. This change in status is detected by the micro-controller 30 connected to the e-button switch module 38, which begins timing the duration of this status change (i.e. the time that the e-buttons are held in close proximity of a few millimeters to a centimeter or so). When a pre-programmed time limit is exceeded (in the range 1-10 s, preferably about 2 s) the micro-controllers 30 then begin a registration or pairing process.

The exact details of such a process depend on the specific radio standard employed, but typically such processes involve the exchange of radio device identifiers, so that future messages can be addressed to a specific device having said identifier. Hence, an e-button or device identifier is either randomly generated, or selected from a stored list or retrieved if the identifier is pre-programmed and unique. For example, the ZigBee scheme provides for IEEE defined unique, hardwired 48 or 64-bit identifiers. Such registration processes may also involve a limited amount of pre-programmed service or capability data to be exchanged.

When the registration process is complete, the indication LED 36 (under control of micro-controller 30) preferably indicates the successful completion of the exchange to the user, thereby signifying the configuring of a link between the first and second e-button. For example, the LED may flash when proximity is first detected and, following the predetermined time period and exchange, then remain on following successful exchange. Of course, the LED may be controlled by the micro-controller to signify the status to the user in other ways, and other audible or vibration means may be incorporated depending on a manufacturers cost options.

Figure 4C:
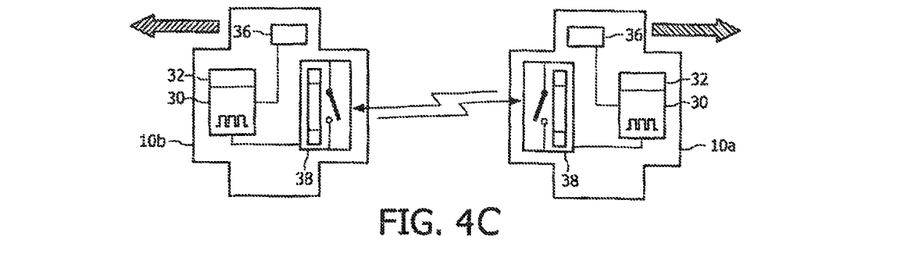
FIG. 4C is a diagram illustrating a third steps in the configuration of a link between a first and second e-button.

Following the indication, the user simply physically separates the two e-buttons as shown in FIG. 4C, the switches open and the paired e-buttons may be engaged with the Hi-Fi and loudspeaker (for example) to provide a wireless link therebetween.

Suppose that the user, at some future date, decides to pair the first e-button 10a with another or further e-button. He may simply repeat the process shown in FIGS. 4A, 4B and 4C, thereby creating a one-to-many link regarding the first e-button and several other e-buttons.

Conversely, to delete or cancel a link already established between two e-buttons, the user simply repeats the steps of FIGS. 4A, 4b and 4C with the required e-buttons. In this instance the micro-controllers 30 check the exchanged identifier with those already received and stored. Should a match be found, the micro-controller deletes the exchanged and stored identifier thereby severing the link. Hence, an automatic deregistration (or "un-pairing") process is provided requiring no more steps than already described for the user.

Optionally, the indicator LED 36 may also indicate to a user that a link already exists during the predetermined time-period. Hence, a user may check whether an e-button is linked with another by bringing them together, and should the LED signify the existence of such a link, the user then separates the e-buttons before the registration (or de-registration) process begins.

Figure 5:
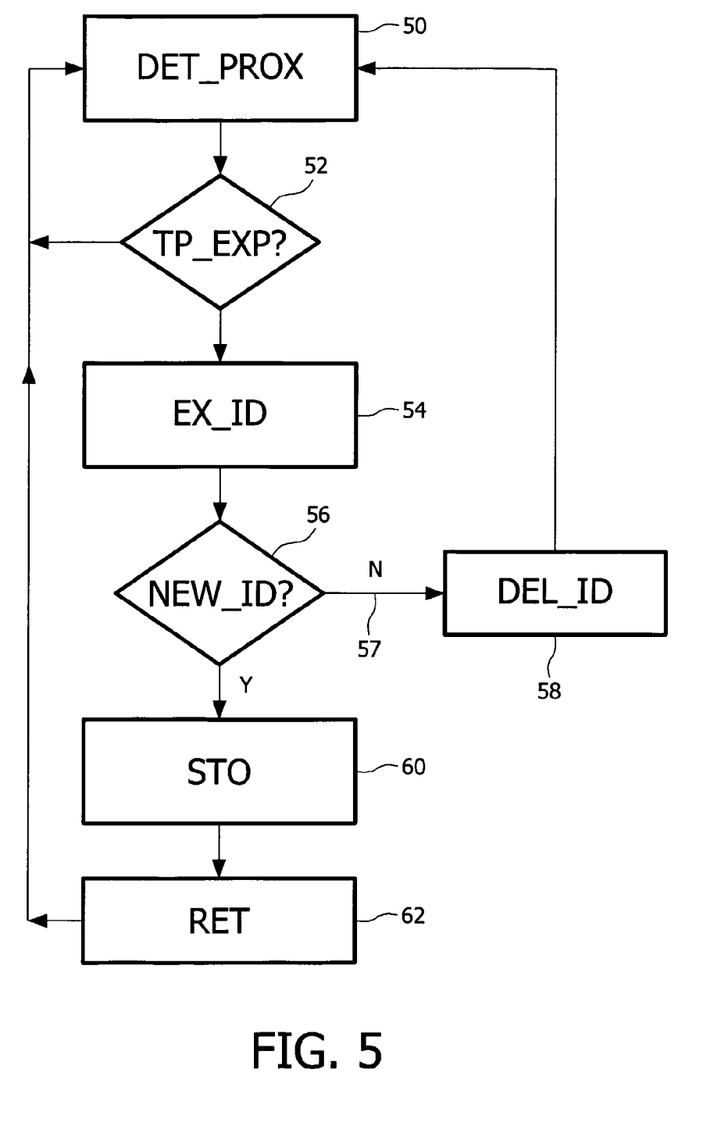
FIG. 5 is a flowchart representing steps in a method for configuring a link between two e-buttons.

FIG. 5 illustrates generally the process steps described above, and followed by an e-button micro-controller suitably programmed. In a first step 50, proximity is detected (DET_PROX), following which the micro-controller begins monitoring at step 52 for the expiration of the predetermined time period (TP_EXP?). When the period is ended, and proximity is still detected, program flow follows to step 54 in which the e-button identifiers are exchanged (EX_ID). The micro-controller then checks at step 56 whether the received identifier is already known (NEW_ID?) to it, and if so follows path 57 to achieve deletion of the identifier at step 58.

In the event that the check at step 56 reveals that the identifier is new, then the micro-controller stores (STO) the identifier at step 60, performs other operations related to registration and establishment of a link with the e-button providing the identifier, and finally returns at step 62 to monitoring for proximity detection.

The indication steps of the process are not shown in FIG. 5, but those skilled in the art will appreciate that the micro-controller may be programmed to indicate the status of the process, and whether links are already configured, newly configured or deleted as appropriate.

Hence, an intuitive, simple and flexible mechanism for configuring radio links in a system is provided.

Figure 6:
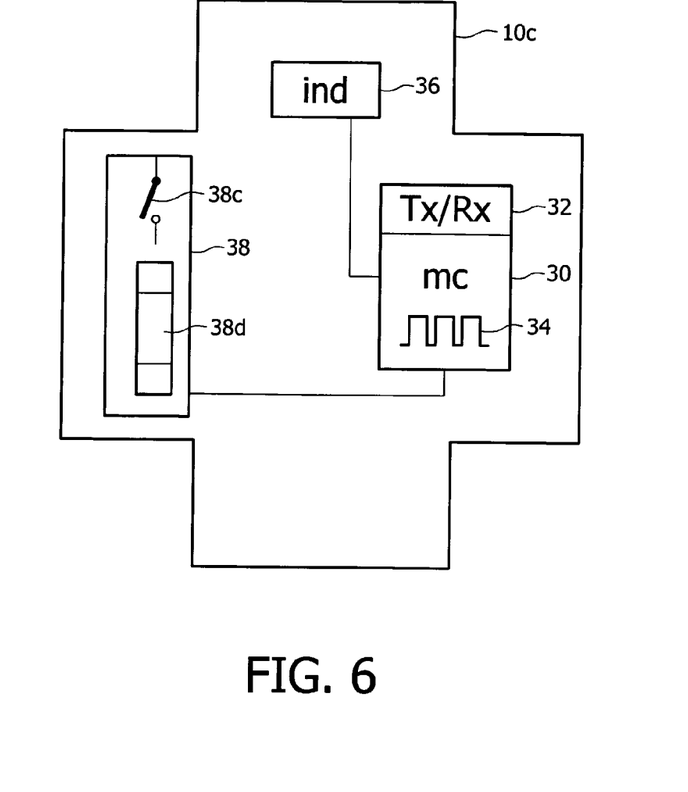
FIG. 6 is a schematic diagram showing a different arrangement of the internal components of an e-button.

FIG. 6 shows an e-button 10c as before except that the proximity-switching module 38 is arranged differently. In this device embodiment, the magnet 38d is of sufficient strength to close the switch 38c, but is disposed in relation to the switch 38c such that the magnetic field lines emanating from the magnet 38d are parallel to the direction in which the switch 38c closes. Hence, little or no closing force is present on the switch.

Figure 7:
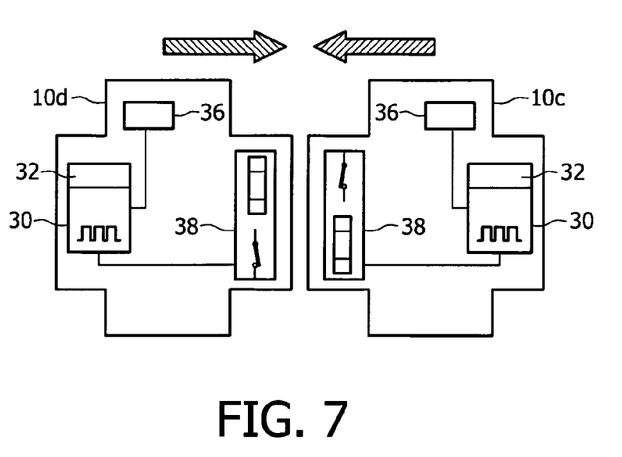
FIG. 7 illustrates the e-buttons of FIG. 6 when brought into close proximity.

However, as shown in FIG. 7, the magnet 38d of another similarly designed e-button 10d may supply sufficient force roughly perpendicular to the direction in which the switch 38c of e-button 10c closes. Hence, proximity may be detected, with the e-buttons operating as previously described to configure links therebetween. Preferably, the e-buttons 10c and 10d are shaped or labelled so as to indicate to a user the preferred proximity orientation of the e-buttons when configuring links.

Those skilled in the art will further recognise that the e-buttons, if sold separately, may be powered using an internal power supply initially inhibited by the proximity detection switch module. For example, a watch battery or the like may be inhibited from powering up the e-button by a suitably placed magnetic field supplied in or by the shelf packaging material. Once the e-button is removed, the switch opens and the internal power supply (not shown in the Figures) powers up the micro-controller and hence the e-button.

Those skilled in the art will additionally appreciate that the e-button may draw power from a host apparatus once it is engaged with said host apparatus.

In the above a radio system, devices and methods of configuring radio links are described. Whilst the above embodiments describe a system utilising e-buttons having magnetic proximity detection means (such as Reed switches and Hall switches) to detect and configure links between said e-buttons, those skilled in the art will recognise that other variations on proximity detection may be used.

For example, the e-buttons may be modified to physically attach to each other to provide proximity detection, or perhaps may incorporate a very short-range optical (for example infrared) circuit for detecting proximity and thus initiating configuration of a wireless link. Similarly, those skilled in the art will appreciate that the means for engaging an e-button or device with a host apparatus may comprise infra-red or other non-physical short range engagement means, with data from the host apparatus being received by the engaged device and converted for longer range radio transmission.

From reading the present disclosure, other modifications will be apparent to persons skilled in the art. Such modifications may involve other features which are already known in the design, manufacture and use of radio devices, host apparatus for receiving said devices and component parts thereof and which may be used instead of or in addition to features already described herein without departing from the spirit and scope of the present invention.

In the present specification and claims the word "a" or "an" preceding an element does not exclude the presence of a plurality of such elements.

The invention claimed is:

1. A method of configuring a radio link between a first and a second radio device, comprising the acts of:
    detecting by a proximity detector a proximity between the first and second radio device when the first and second radio device are within an establishment threshold distance of each other;
    in response to detecting the proximity, activating a timer to measure a duration of the proximity of the first and second radio device to each other;
    determining in a processor when the measured duration of detection of proximity exceeds an establishment threshold duration, and
    establishing a radio link between the first and second radio devices in response to a determination that the measured duration of proximity exceeds the establishment threshold duration and if the radio link is not already established, the act of establishing the radio link using respective transceivers of the first and second radio devices.

2. The method of claim 1, wherein the establishment threshold duration is between one and ten seconds.

3. The method of claim 1, wherein the establishment threshold duration is 2 seconds.

4. The method of claim 1, wherein the establishment threshold distance is between 2 millimeters and one centimeter.

5. The method of claim 1, wherein the act of establishing the radio link includes the act of exchanging identifiers of the first and second radio device, wherein the identifiers are pre-installed radio identifiers.

6. The method of claim 1, wherein the act of establishing the radio link includes the act of exchanging identifiers of the first and second radio device, wherein the identifiers are randomly generated radio identifiers.

7. The method of claim 1,
wherein the act of establishing the radio link includes the act of exchanging identifiers of the first and second radio device so that an identifier of the first radio device is stored in the second radio device and an identifier of the second radio device is stored in the first radio device, and
the method comprising the act of cancelling the radio link in response to a determination that the measured duration of proximity exceeds a cancellation threshold duration and if a radio link is already established, the act of canceling the radio link including the acts of deleting the identifier of the first radio device stored in the second radio device and the identifier of the second radio device stored in the first radio device.

8. The method of claim 1, comprising the act of indicating a configuration status of the link.

9. The method of claim 8, wherein the indicating act includes flashing a light source when the proximity is detected and maintaining on the light source when the radio link is established.

10. The method of claim 1, comprising cancelling the radio link between the first and second radio devices in response to the proximity being within a cancellation threshold distance and the duration of the proximity exceeding a cancellation threshold duration, using respective transceivers of the first and second radio devices, if the radio link is already established.

11. The method of claim 1, comprising:
physically connecting the first and second radio device to respective first and second host apparatus for the first and second radio device to communicate data with the respective first and second host through the respective physical connections, and
communicating data between the first and second host apparatus via the radio link between the first and second radio device by way of the respective physical connection and the respective first and second radio devices.

12. A system having radio devices comprising:
a first and a second radio device;
at least one of the first and second radio device comprising a proximity detector configured to detect a proximity between the first and second radio device when the first and second radio device are within an establishment threshold distance of each other; and
at least one of the first and second radio device comprising a timer which is activated in response to the proximity detector detecting the proximity between the first and second radio device, and configured to measure a duration of the detected proximity between the first and second radio device;
at least one of the first and second radio device comprising a processor to determine when the measured duration of the detected proximity exceeds an establishment threshold duration; and
each of the first and second radio device comprising a respective transceiver to establish a radio link between the first and second radio device in response to the determination that the measured duration of proximity detection exceeds the establishment threshold duration and if the radio link is not already established.

13. The system of claim 12, wherein the establishment threshold duration is between one and ten seconds.

14. The system of claim 12, wherein the establishment threshold distance is between 2 millimeters and one centimeter.

15. The system of claim 12, wherein the first and second radio device are configured to exchange identifiers, and wherein the identifiers are one of pre-installed radio identifiers and randomly generated radio identifiers.

16. The system of claim 12,
wherein when a radio link is being established the first and second radio device are configured to exchange identifiers so that an identifier of the first radio device is stored in the second radio device and an identifier of the second radio device is stored in the first radio device, and
wherein the first and second radio device are configured to cancel the radio link in response to a determination that the measured duration of proximity exceeds a cancellation threshold duration and if a radio link is already established, canceling the radio link including deleting the identifier of the first radio device stored in the second radio device and the identifier of the second radio device stored in the first radio device.

17. The system of claim 12, comprising a light source configured to flash when the proximity is detected and remain on when the radio link is established.

18. The system of claim 12, wherein the system comprises first and second host apparatus and the first and second radio device are configured to physically connect with respective first and second host apparatus, for the first and second radio device to communicate with the respective first and second host apparatus through the respective physical connections, and wherein the first and second host apparatus communicate with one another via the radio link between the first and second radio devices by way of the respective physical connections and the respective first and second radio devices.

19. The system of claim 12 wherein
each of the first and second radio device have a respective proximity detector configured to detect a proximity between the first and second radio device when the first and second radio device are within an establishment threshold distance of each other; and
in response to respective detections of proximity of the first and second radio device, the first and second radio devices exchange identifiers and determine whether there is a radio link between the first and second radio devices.

20. The system of claim 12, comprising:
each of the first and second radio devices comprise a respective proximity detector configured to detect a proximity between the first and second radio device when the first and second radio device are within the establishment threshold distance of each other; and
each of the first and second radio device comprise a respective timer which is activated in response to the respective proximity detector detecting the proximity between the first and second radio device, and configured to measure a respective duration of the respective detected proximity between the first and second radio device;
each of the first and second radio device comprise a respective processor to determine if the respective measured duration of the respective detected proximity exceeds the establishment threshold duration; and
each of the first and second radio device comprise a respective transceiver to establish a radio link between the first and second radio device in response to a respective determination by respective processors of both the first and second radio devices that the respective measured duration of respective detected proximity exceeds the respective establishment threshold duration and that the radio link is not already established.

21. A first radio device operable to communicate via a radio link with a second radio device, the first radio device comprising:

a proximity detector to detect proximity between the first and second radio device when the first and second radio device are within an establishment threshold distance of each other;

a timer to measure a duration of the detected proximity;

a processor to determine when the measured duration of the detected proximity exceeds an establishment threshold duration; and a transceiver to establish the radio link between the first and second device in response to a determination that the measured duration of detected proximity exceeds the establishment threshold duration and if the radio link is not already established.

22. The first radio device of claim 21, wherein the proximity detector of the first radio device comprise a reed switch, the reed switch operating when positioned substantially perpendicular to magnetic field lines emanating from a magnet of the second radio device, wherein the combination of the sensitivity of the reed switch and the field strength of the magnet is such that the reed switch operates when the first and second radio devices are within the establishment threshold distance of each other and the reed switch is positioned substantially perpendicular to the field lines of the magnet, and the reed switch does not operate when it is not positioned substantially perpendicular to the magnetic field lines of the magnet.

23. The first radio device of claim 21, wherein the processor is a micro-controller comprising the timer and communicating with the proximity detector and controlling the transceiver.

24. The first radio device of claim 21, wherein the first radio device is configured to physically connect to a host apparatus and to transmit data to and receive data from the host through the physical connection.

25. The first radio device of claim 21, wherein the first radio device is configured to physically connect to a host apparatus and allow the host apparatus to communicate with the second radio device via the radio link between the first and second radio device by way of the physical connection and the first radio device.

26. The first radio device of claim 21, wherein the proximity detector comprise at least one of: a hall switch or a reed switch of the first radio device, the switch being activated by a magnet of the second radio device when the second radio device is within the establishment threshold distance of the first radio device, wherein the switch is connected to the timer for determination of duration of activation of the switch and establishment of the radio link in response to the duration of activation exceeding the establishment threshold duration.

27. The first radio device of claim 21 wherein the transceiver is configured to cancel the radio link between the first and second device in response to the measured duration of proximity detection exceeding a cancellation threshold duration if the radio link is already established.

28. A method of operating a first radio device to communicate via a radio link with a second radio device, the first radio device performing the acts of:

detecting by a proximity detector a proximity between the first and second radio device when the first and second radio device are within an establishment threshold distance of each other;

measuring by a timer a duration of the detection of proximity;

determining by a processor when the measured duration of the detection of proximity exceeds an establishment threshold duration; and establishing the radio link using a transceiver in response to a determination that the measured duration of detection of proximity exceeds the establishment threshold duration and if the radio link is not already established.

29. The method of claim 28, wherein the act of establishing a radio link comprises the acts of:

transmitting an identifier of the first radio device to the second radio device, in response to the measurement of duration of the detection of proximity exceeding an establishment threshold duration, and receiving an identifier of the second radio device from the second radio device.

30. The method of claim 28, comprising canceling the radio link using the transceiver in response to the proximity detecting indicating that a distance between the first and second radio device is within a canceling threshold distance and the processor determining that the duration of the proximity detection measured by the timer exceeds a canceling threshold duration and if the radio link is already established.

31. The method of claim 28, comprising:

physically connecting the first radio device to a host apparatus to allow data communication between the first radio device and the host apparatus through the physical connection; and communicating data between the host apparatus and the second radio device via the radio link between the first and second radio device by way of the physical connection and the first radio device.

32. A non-transitive computer readable media encoded with instructions for controlling a processor of a first radio device to communicate via a radio link with a second radio device, the processor performing the acts of:

receiving proximity signals from a proximity detector indicating a proximity between the first and second radio device when the first and second radio device are within an establishment threshold distance of each other;

initiating a timer when the detection of proximity begins;

receiving duration signals from the timer indicating a duration of the detection of proximity;

determining when the duration of the detection of proximity exceeds an establishment threshold duration;

establishing the radio link using a transceiver controlled by the processor in response to a determination that the measured duration of detection of proximity exceeds the establishment threshold duration and if the radio link is not already established.

* * * * *